(12) United States Patent
Maggiore et al.

(10) Patent No.: US 8,599,044 B2
(45) Date of Patent: Dec. 3, 2013

(54) SYSTEM AND METHOD TO ASSESS AND REPORT A HEALTH OF A TIRE

(75) Inventors: Jeanne C. Maggiore, Wildwood, MO (US); Wayne R. Majkowski, Forissant, MO (US); David A. Followell, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 133 days.

(21) Appl. No.: 12/854,646

(22) Filed: Aug. 11, 2010

(65) Prior Publication Data

US 2012/0038492 A1     Feb. 16, 2012

(51) Int. Cl.
*G08B 21/00* (2006.01)

(52) U.S. Cl.
USPC ........... 340/945; 340/438; 340/442; 340/443; 340/445; 340/447; 340/505; 73/146.2; 73/146.5

(58) Field of Classification Search
USPC ............ 340/945, 438, 442–447, 505; 73/146, 73/146.2, 146.5
See application file for complete search history.

(56) References Cited

U.S. PATENT DOCUMENTS

| | | |
|---|---|---|
| 4,463,428 A | 7/1984 | Gilliam |
| 4,918,321 A | 4/1990 | Klenk et al. |
| 5,036,935 A | 8/1991 | Kohara |
| 5,220,263 A | 6/1993 | Onishi et al. |
| 5,237,404 A | 8/1993 | Tanaka et al. |
| 5,318,254 A | 6/1994 | Shaw et al. |
| 5,324,948 A | 6/1994 | Dudar et al. |
| 5,334,982 A | 8/1994 | Owen |
| 5,340,056 A | 8/1994 | Guelman et al. |
| 5,351,621 A | 10/1994 | Tanaka et al. |
| 5,487,440 A | 1/1996 | Seemann |
| 5,490,646 A | 2/1996 | Shaw et al. |
| 5,633,707 A | 5/1997 | Seemann |
| 5,695,155 A | 12/1997 | Macdonald et al. |
| 5,726,705 A | 3/1998 | Imanishi et al. |
| 5,831,570 A | 11/1998 | Ammar et al. |
| 5,832,187 A | 11/1998 | Pedersen et al. |
| 5,845,002 A | 12/1998 | Heck et al. |
| 5,845,725 A | 12/1998 | Kawada |
| 5,995,884 A | 11/1999 | Allen et al. |

(Continued)

FOREIGN PATENT DOCUMENTS

| | | |
|---|---|---|
| EP | 0512866 A1 | 11/1992 |
| EP | 1193168 A2 | 4/2002 |

(Continued)

OTHER PUBLICATIONS

PCT Notification of Transmittal of the International Search Report and the Written Opinion of the International Searching Authority, International Application No. PCT/US2011/029766, International filing date Mar. 24, 2011.

(Continued)

*Primary Examiner* — Tai T Nguyen
(74) *Attorney, Agent, or Firm* — Yee & Associates, P.C.

(57) ABSTRACT

The different advantageous embodiments provide an apparatus comprising a number of tires for a vehicle, a number of systems, and a number of processor units. The number of systems is configured to generate data about the number of tires and the vehicle. The number of processor units is configured to monitor the data and manage the health of the number of tires.

22 Claims, 5 Drawing Sheets

(56) References Cited

U.S. PATENT DOCUMENTS

| | | | |
|---|---|---|---|
| 6,236,735 B1 | 5/2001 | Bjorner et al. | |
| 6,266,138 B1 | 7/2001 | Keshavmurthy | |
| 6,293,141 B1 | 9/2001 | Nance | |
| 6,364,026 B1 | 4/2002 | Doshay | |
| 6,476,712 B1* | 11/2002 | Achterholt | 340/447 |
| 6,565,361 B2 | 5/2003 | Jones et al. | |
| 6,671,588 B2 | 12/2003 | Otake et al. | |
| 6,819,265 B2 | 11/2004 | Jamieson et al. | |
| 6,825,758 B1* | 11/2004 | Laitsaari | 340/442 |
| 6,888,446 B2* | 5/2005 | Nantz et al. | 340/433 |
| 6,904,335 B2 | 6/2005 | Solomon | |
| 6,907,799 B2 | 6/2005 | Jacobsen et al. | |
| 6,947,797 B2 | 9/2005 | Dean et al. | |
| 6,984,952 B2 | 1/2006 | Peless et al. | |
| 7,076,335 B2 | 7/2006 | Seemann | |
| 7,212,106 B2 | 5/2007 | Katou | |
| 7,218,993 B2 | 5/2007 | Yasukawa et al. | |
| 7,236,861 B2 | 6/2007 | Paradis et al. | |
| 7,250,849 B2 | 7/2007 | Spriggs et al. | |
| 7,280,890 B2 | 10/2007 | Seemann | |
| 7,327,112 B1 | 2/2008 | Hlynka et al. | |
| 7,337,156 B2 | 2/2008 | Wippich | |
| 7,414,523 B2 | 8/2008 | Li et al. | |
| 7,417,738 B2 | 8/2008 | Taylor et al. | |
| 7,499,772 B2 | 3/2009 | Wilcox et al. | |
| 7,501,616 B2 | 3/2009 | Wiklof | |
| 7,586,422 B2 | 9/2009 | Goodman et al. | |
| 7,626,513 B2 | 12/2009 | Goodman et al. | |
| 7,627,447 B2 | 12/2009 | Marsh et al. | |
| 7,714,702 B2 | 5/2010 | Khuzadi | |
| 7,765,038 B2 | 7/2010 | Appleby et al. | |
| 7,765,668 B2 | 8/2010 | Townsend et al. | |
| 7,796,018 B2 | 9/2010 | Khuzadi | |
| 7,797,095 B2 | 9/2010 | Rado | |
| 7,813,888 B2 | 10/2010 | Vian et al. | |
| 7,817,026 B2 | 10/2010 | Watabe et al. | |
| 7,832,281 B2 | 11/2010 | Mian et al. | |
| 7,844,364 B2 | 11/2010 | McLurkin et al. | |
| 7,860,618 B2 | 12/2010 | Brandstetter et al. | |
| 7,894,948 B2 | 2/2011 | Stroud | |
| 7,941,261 B2 | 5/2011 | Johnsen | |
| 8,051,547 B2 | 11/2011 | Toh et al. | |
| 8,060,270 B2 | 11/2011 | Vian et al. | |
| 8,078,319 B2 | 12/2011 | Franke et al. | |
| 8,140,250 B2 | 3/2012 | Mian et al. | |
| 8,145,367 B2 | 3/2012 | Khatwa et al. | |
| 8,150,105 B2 | 4/2012 | Mian et al. | |
| 8,181,532 B2 | 5/2012 | Schmidt et al. | |
| 8,260,485 B1 | 9/2012 | Meuth et al. | |
| 2003/0089183 A1 | 5/2003 | Jacobsen et al. | |
| 2003/0135327 A1 | 7/2003 | Levine et al. | |
| 2003/0169335 A1 | 9/2003 | Monroe | |
| 2004/0030571 A1 | 2/2004 | Solomon | |
| 2004/0054507 A1 | 3/2004 | Mott | |
| 2004/0073324 A1 | 4/2004 | Pierro et al. | |
| 2004/0073411 A1 | 4/2004 | Alston et al. | |
| 2004/0158358 A1 | 8/2004 | Anezaki et al. | |
| 2005/0073585 A1 | 4/2005 | Ettinger et al. | |
| 2005/0093687 A1* | 5/2005 | Katou | 340/445 |
| 2005/0113943 A1 | 5/2005 | Nian | |
| 2005/0126794 A1 | 6/2005 | Palmer et al. | |
| 2005/0217589 A1 | 10/2005 | Daniel et al. | |
| 2006/0085106 A1 | 4/2006 | Gaudiano et al. | |
| 2006/0184291 A1 | 8/2006 | Paradis et al. | |
| 2006/0187014 A1* | 8/2006 | Li et al. | 340/447 |
| 2006/0198952 A1 | 9/2006 | Nagase et al. | |
| 2006/0243857 A1 | 11/2006 | Rado | |
| 2006/0271251 A1 | 11/2006 | Hopkins | |
| 2007/0062299 A1 | 3/2007 | Mian et al. | |
| 2007/0081154 A1 | 4/2007 | Mapoles et al. | |
| 2007/0113690 A1 | 5/2007 | Wilcox et al. | |
| 2007/0129847 A1 | 6/2007 | Ulmer et al. | |
| 2007/0146728 A1 | 6/2007 | Pristner | |
| 2007/0208442 A1 | 9/2007 | Perrone | |
| 2007/0272841 A1 | 11/2007 | Wiklof | |
| 2008/0004749 A1 | 1/2008 | Hostettler | |
| 2008/0021604 A1 | 1/2008 | Bouvier et al. | |
| 2008/0140318 A1 | 6/2008 | Breed | |
| 2008/0143503 A1* | 6/2008 | Watabe et al. | 340/438 |
| 2008/0148876 A1 | 6/2008 | Hock et al. | |
| 2008/0154458 A1 | 6/2008 | Brandstetter et al. | |
| 2008/0177411 A1 | 7/2008 | Marsh et al. | |
| 2008/0252489 A1 | 10/2008 | Naimer et al. | |
| 2008/0270866 A1 | 10/2008 | Choi | |
| 2008/0297333 A1 | 12/2008 | Khuzadi | |
| 2008/0297375 A1 | 12/2008 | Khuzadi | |
| 2009/0079839 A1 | 3/2009 | Fischer et al. | |
| 2009/0219393 A1 | 9/2009 | Vian et al. | |
| 2009/0243828 A1 | 10/2009 | Hering et al. | |
| 2009/0285491 A1 | 11/2009 | Ravenscroft et al. | |
| 2010/0017052 A1 | 1/2010 | Luce | |
| 2010/0023201 A1 | 1/2010 | Kinney et al. | |
| 2010/0039294 A1 | 2/2010 | Feyereisen et al. | |
| 2010/0063650 A1 | 3/2010 | Vian et al. | |
| 2010/0094487 A1 | 4/2010 | Brinkman | |
| 2010/0211358 A1 | 8/2010 | Kesler et al. | |
| 2010/0235037 A1 | 9/2010 | Vian et al. | |
| 2010/0250022 A1 | 9/2010 | Hines et al. | |
| 2010/0271191 A1* | 10/2010 | de Graff et al. | 340/447 |
| 2010/0312387 A1 | 12/2010 | Jang et al. | |
| 2010/0312388 A1 | 12/2010 | Jang et al. | |
| 2011/0313614 A1 | 12/2011 | Hinnant, Jr. et al. | |
| 2012/0041639 A1 | 2/2012 | Followell et al. | |
| 2012/0081540 A1 | 4/2012 | Jang | |
| 2012/0130701 A1 | 5/2012 | Khella | |
| 2012/0261144 A1 | 10/2012 | Vian et al. | |

FOREIGN PATENT DOCUMENTS

| | | |
|---|---|---|
| EP | 1619625 | 1/2006 |
| EP | 1884453 A2 | 2/2008 |
| EP | 2208971 | 7/2010 |
| EP | 2259245 | 12/2010 |
| FR | 2930669 A1 | 10/2009 |
| GB | 2308656 | 7/1997 |
| GB | 2429819 A | 3/2007 |
| JP | 2007183172 | 7/2007 |
| WO | WO2004081488 | 9/2004 |
| WO | 2005113261 A1 | 12/2005 |
| WO | WO2006053433 | 5/2006 |
| WO | WO2007080584 | 7/2007 |
| WO | 2008127468 A2 | 10/2008 |
| WO | 2009142933 A2 | 11/2009 |
| WO | WO2010141180 | 12/2010 |
| WO | WO2011119634 | 9/2011 |
| WO | WO2012021177 | 2/2012 |
| WO | WO2012021179 | 2/2012 |
| WO | W02012047479 | 4/2012 |

OTHER PUBLICATIONS

PCT Search Report regarding Application PCT/US2011/029466, filling date Mar. 22, 2011, Issued by International Searching Authority.
GB Combined Search and Examination Report for application P49034GB/AER dated Jun. 10, 2010.
PCT Search Report for application PCT/US2010/033917 dated Nov. 26, 2010.
U.S. Appl. No. 12/404,493, filed Mar. 16, 2009, Vian et al.
U.S. Appl. No. 11/857,217, filed Sep. 18, 2007, Vian et al.
U.S. Appl. No. 12/372,616, filed Feb. 17, 2009, Kesler et al.
U.S. Appl. No. 12/701,033, filed Feb. 5, 2010, Kesler et al.
U.S. Appl. No. 12/124,565, filed May 21, 2008, Vian et al.
U.S. Appl. No. 12/479,667, filed Jun. 5, 2009, Jang et al.
U.S. Appl. No. 12/560,569, filed Feb. 5, 2010, Jang et al.
"In-Sight Line Scan Vision System", Webinar, COGNEX, retrieved Feb. 5, 2010, http:www.cognex.com.
Frost, "A Practical Guide to Using the In-Sight 5604 Line Scan Vision System—Integration Note", Mar. 23, 2009, In-Sight Vision systems, COGNEX, pp. 1-20.
Ollero, "Mutliple Heterogenous Unmanned Aerial Vehicles", Springer Tracts in Advanced Robotics, vol. 37, Copyright 2007, 233 pages (Abstract).

(56) References Cited

OTHER PUBLICATIONS

"Unmanned Aerial Vehicle (UAV) ZALA 421-04M chosen for Aerial Monitoring of Forest Fires", published by news.wood.ru, Feb. 2010, 3 pages.

Gunatilake et al., "Image Understanding Algorithms for Remote Visual Inspection of Aircraft Surfaces", Proceedings of the SPIE conference on Machine Vision Applications in Industrial Inspection V, Copyright 1997, 12 pages.

DeVault, "Robotic system for underwater inspection of bridge piers", IEEE Instrumentation & Measurement Magazine, vol. 3, Iss.3, Sep. 2000, pp. 32-37 (Abstract).

GB Search Report and Examination Report dated Jun. 14, 2011 regarding application GB1100763.0, applicant's reference P51280GB/AER/LJW, applicant The Boeing Company, 9 pages.

Maggiore et al., "Runway Condition Monitoring", U.S. Appl. No. 12/730,594, filed Mar. 14, 2010, 43 pages.

PCT Search Report dated Feb. 16, 2012 regarding international application PCT/US2011/030150, applicant's reference 10-0174PCT, applicant The Boeing Company, 6 pages.

PCT Search Report dated Feb. 7, 2012 regarding international application PCT/US2011/051830, applicant's reference 10-0602PCT, applicant The Boeing Company, 4 pages.

USPTO Office Action dated Oct. 4, 2011 regarding U.S. Appl. No. 12/701,033, 24 pages.

USPTO Final Office Action dated Apr. 13, 2012 regarding U.S. Appl. No. 12/701,033, 18 pages.

USPTO Office Action dated Apr. 13, 2012 regarding U.S. Appl. No. 12/404,493, 22 pages.

USPTO Office Action dated Jun. 15, 2012 regarding U.S. Appl. No. 13/086,521, 18 pages.

USPTO Office Action dated Nov. 8, 2010 regarding U.S. Appl. No. 12/124,565, 13 pages.

USPTO Final Office Action dated Mar. 15, 2011 regarding U.S. Appl. No. 12/124,565, 14 pages.

USPTO Notice of Allowance dated Aug. 18, 2011 regarding U.S. Appl. No. 12/124,56, 7 pages.

USPTO Office Action dated Feb. 24, 2012 regarding U.S. Appl. No. 12/560,569, 27 pages.

USPTO Final Office Action dated Jul. 24, 2012 regarding U.S. Appl. No. 12/560,569, 23 pages.

USPTO Office Action dated May 10, 2011 regarding U.S. Appl. No. 12/372,616, 27 pages.

USPTO Final Office Action dated Oct. 28, 2011 regarding U.S. Appl. No. 12/372,616, 30 pages.

USPTO Office Action dated Feb. 15, 2012 regarding U.S. Appl. No. 12/372,616, 22 pages.

USPTO Final Office Action dated Jul. 12, 2012 regarding U.S. Appl. No. 12/372,616, 23 pages.

USPTO Office Action dated Feb. 21, 2012 regarding U.S. Appl. No. 12/479,667, 25 pages.

USPTO Office Action dated Aug. 16, 2012 regarding U.S. Appl. No. 12/730,594, 25 pages.

USPTO Office Action dated Aug. 31, 2012 regarding U.S. Appl. No. 12/701,033, 28 pages.

USPTO Final Office Action dated Oct. 3, 2012 regarding U.S. Appl. No. 12/404,493, 18 pages.

Office Action, dated Dec. 21, 2012, regarding U.S. Appl. No. 12/372,616, 39 pages.

Final Office Action, dated Jan. 8, 2013, regarding U.S. Appl. No. 12/701,033, 27 pages.

Final Office Action, dated Dec. 20, 2012, regarding U.S. Appl. No. 12/730,594, 35 pages.

Office Action, dated Dec. 6, 2012, regarding U.S. Appl. No. 12/897,158, 51 pages.

Office Action, dated May 23, 2013, regarding U.S. Appl. No. 12/70,594, 28 pages.

Office Action, dated Mar. 28, 2013, regarding U.S. Appl. No. 12/854,671, 37 pages.

Office Action, dated Sep. 10, 2013, regarding USPTO U.S. Appl. No. 12/372,616, 25 pages.

Office Action, dated Sep. 12, 2013, regarding USPTO U.S. Appl. No. 12/701,033, 25 pages.

Office Action, dated Jul. 18, 2013, regarding USPTO U.S. Appl. No. 12/404,493, 42 pages.

Office Action, dated Aug. 28, 2013, regarding USPTO U.S. Appl. No. 12/560,569, 46 pages.

Final Office Action, dated Jul. 12, 2013, regarding USPTO U.S. Appl. No. 12/854,671, 17 pages.

Final Office Action, dated Jun. 26, 2013, regarding USPTO U.S. Appl. No. 12/897,158 38 pages.

* cited by examiner

SYSTEM AND METHOD TO ASSESS AND REPORT A HEALTH OF A TIRE

BACKGROUND INFORMATION

1. Field

The present disclosure relates generally to a data processing system, and more particularly to a system for health management. Still more particularly, the present disclosure relates to management of the health and status of tires on a vehicle.

2. Background

Vehicles such as aircraft typically do not have any form of automated tire monitoring. For these aircraft, mechanics must manually check the tire pressure at least once every twenty-four to forty-eight hours. This information is manually entered into a logbook. Mechanics must also visually inspect tires for damage and wear during the same interval at which they check tire pressure. There is no direct means available to check the tire carcass temperature.

Some newer aircraft have automated tire pressure monitoring systems, which measure the tire pressure and provide it to the operator or maintainer electronically. However, visual inspection for wear and damage is still required to assess the health of a tire. Visual inspections are done with the aircraft parked, so there is always some part of the tire that is not visible to the inspector, that part of the tire on the pavement. Additionally, brake temperature readings, if available, are used to determine if a tire is ready for another take-off event.

Airplane tires have a limited number of retreads of the tire carcass, and tires are one of the most expensive maintenance costs for an operator. The carcass life is based on engineering judgment and non-destructive evaluations, not the actual historical usage environment to which the tire has been subjected. Tracking the aircraft and the location on the aircraft of an installed, serialized tire is accomplished manually.

Therefore, it would be advantageous to have a method and apparatus that addresses one or more of the issues discussed above in order to decrease maintenance events, provide an automated means to assess the health of a tire, and provide a means to extend the tire carcass life.

SUMMARY

The different advantageous embodiments provide an apparatus comprising a number of tires for a vehicle, a number of systems, and a number of processor units. The number of systems is configured to generate data about the number of tires and the vehicle. The number of processor units is configured to monitor the data and manage the health of the number of tires.

The different advantageous embodiments further provide a method for managing the health of a number of tires. Data associated with a tire is received. A determination is made by the algorithms as to whether the data received meets pre-defined criteria. In response to a determination that the data does not meet the pre-defined criteria, a number of component issues associated with the data are identified.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
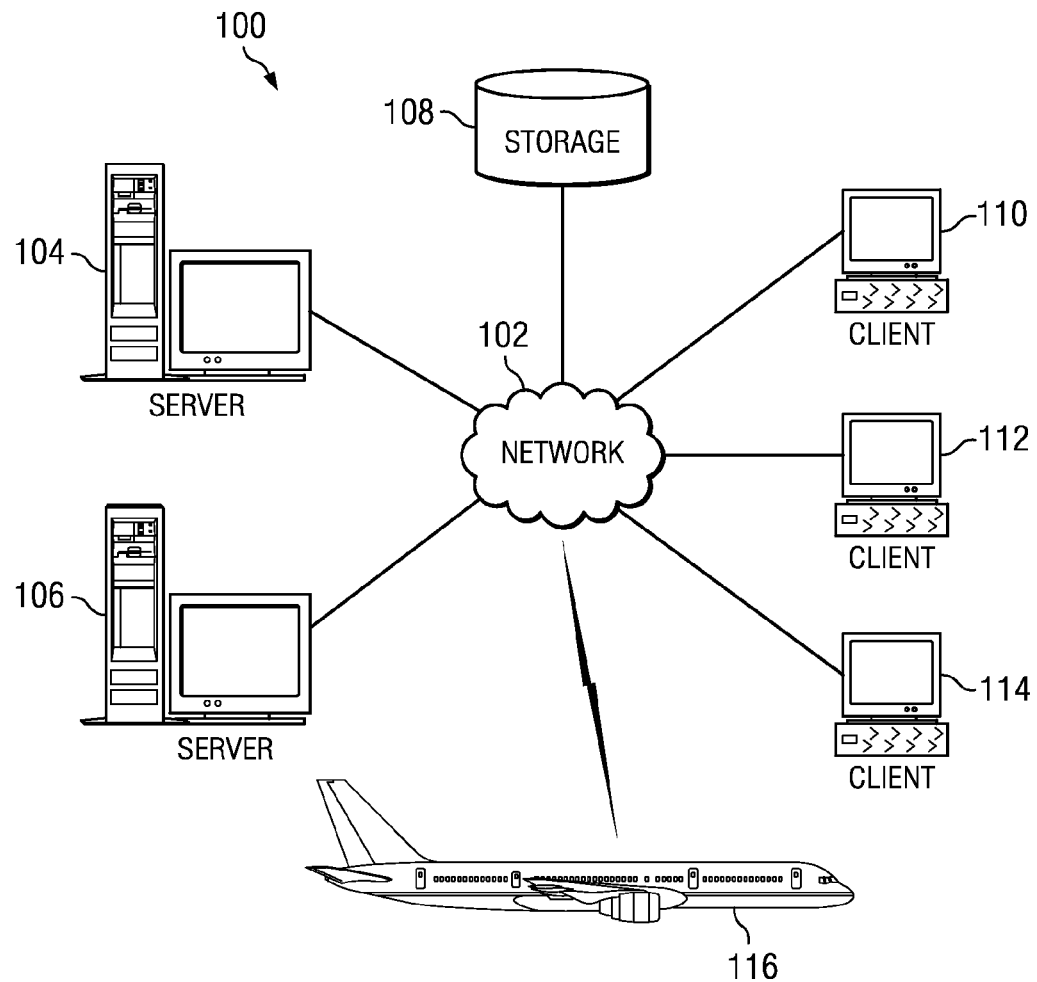
FIG. 1 is an illustration of a network of data processing systems in which an advantageous embodiment may be implemented.
Figure 2:
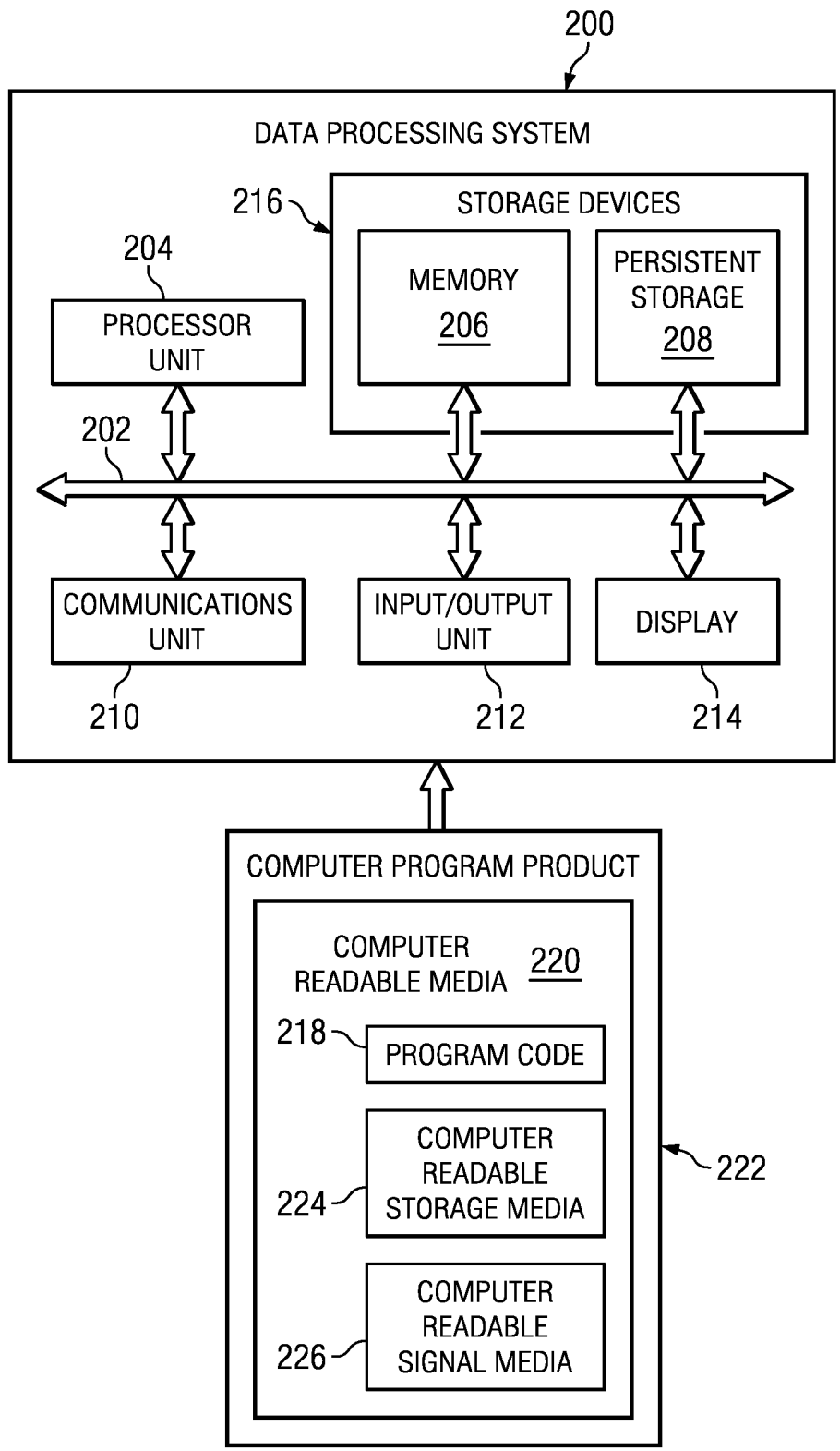
FIG. 2 is an illustration of a data processing system in accordance with an advantageous embodiment.

With reference now to the figures and in particular with reference to FIGS. 1-2, diagrams of data processing environments are provided in which the advantageous embodiments of the present invention may be implemented. It should be appreciated that FIGS. 1-2 are only illustrative and are not intended to assert or imply any limitation with regard to the environments in which different embodiments may be implemented. Many modifications to the depicted environments may be made.

With reference now to the figures, FIG. 1 is an illustration of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. These communication links may be encrypted or otherwise secured in one advantageous embodiment. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers, hand-held devices or network computers. In the depicted example, server 104 provides data, such as boot files, operating system images, data security functions, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, an illustration of a block diagram of a data processing system is depicted in accordance with an advantageous embodiment. Data processing system 200 is an example of a data processing system that may be used to implement servers and clients, such as server 104 and client 110 in FIG. 1. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, a shared processor, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account that current inspection frequency of tires by maintenance personnel requires aircraft operators to employ additional personnel and locate them strategically within their network. Personnel are required to manually and visually inspect appropriate measurands, record the results, and take appropriate actions. Human error may be a by-product of the manual inspection and calculation of these processes.

Current inspection processes result in maintenance actions that are reactive in nature, resulting in gate delays and cancelled flights. These inspections occur at discrete intervals, which encompass multiple flights, thus providing the potential for issues to arise unnoticed between individual flights. The information collected during these current processes is not available to maintenance and operation planners in a sufficiently timely manner to make the most efficient use of the aircraft.

Thus, the different advantageous embodiments provide an apparatus comprising a number of tires for a vehicle, a number of systems, and a number of processor units. The number of systems is configured to generate data about the number of tires and the vehicle. The number of processor units is configured to monitor the data and manage the health of the number of tires.

The different advantageous embodiments further provide a method for managing the health of a number of tires. Data associated with a tire is received. A determination is made as to whether the data received is within pre-defined criteria. In response to a determination that the data is not within the pre-defined threshold values, a number of component issues associated with the data are identified.

Figure 3:
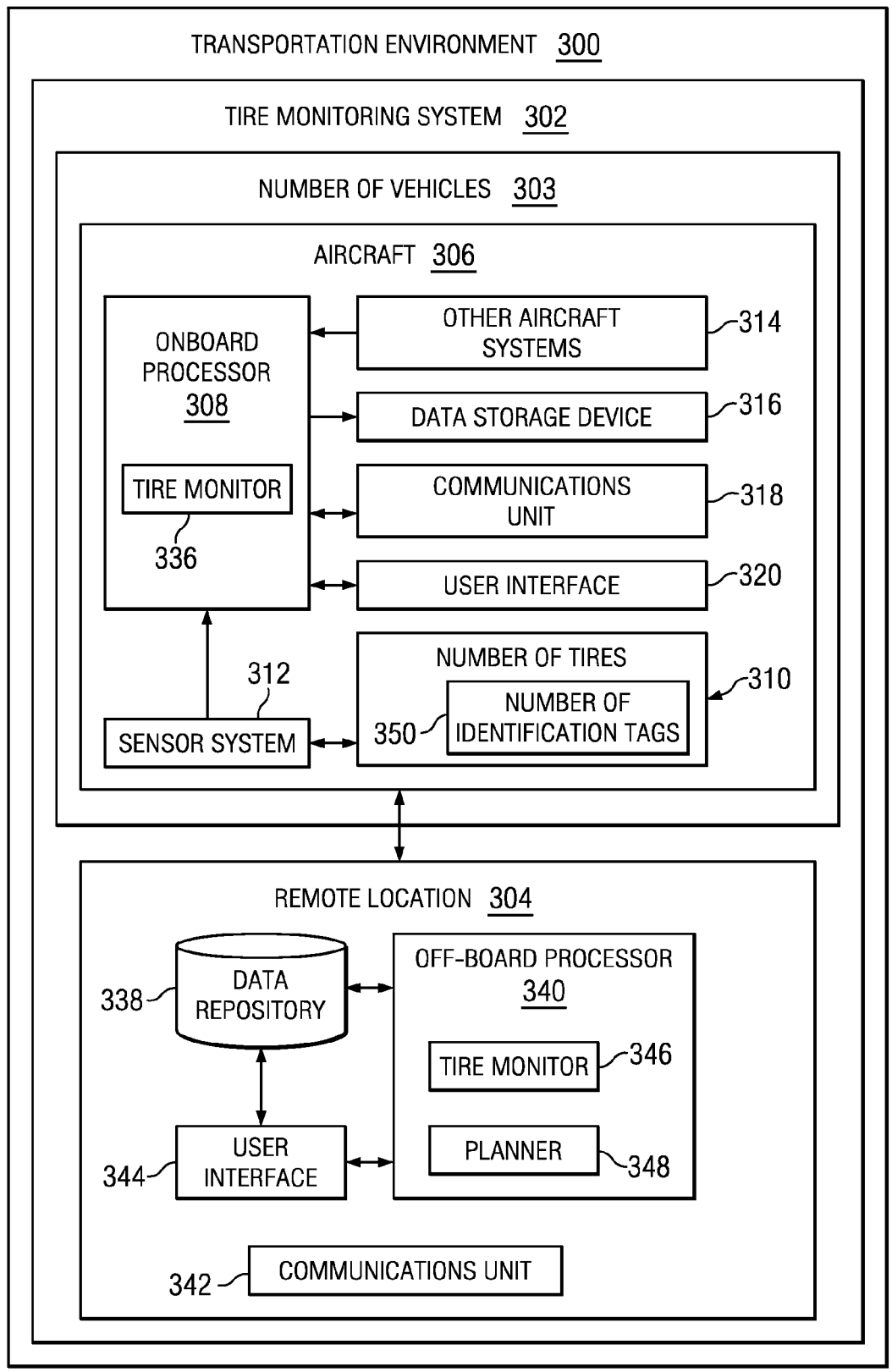
FIG. 3 is an illustration of a transportation environment in accordance with an advantageous embodiment.

With reference now to FIG. 3, an illustration of a transportation environment is depicted in accordance with an advantageous embodiment. Transportation environment 300 may be implemented using a network environment, such as network data processing system 100 in FIG. 1, for example.

Transportation environment 300 includes tire monitoring system 302. Tire monitoring system 302 may be implemented using one or more data processing systems, such as data processing system 200 in FIG. 2. Tire monitoring system 302 includes number of vehicles 303 and remote location 304. Number of vehicles 303 and remote location 304 may communicate using a wireless network, in an illustrative example.

Number of vehicles 303 may be any type of vehicle suitable for transportation. Number of vehicles 303 may include, for example, without limitation, aircraft, rotorcraft, ground vehicles, sea vessels, spacecraft, manned vehicles, unmanned vehicles, and/or any other suitable vehicle. Aircraft 306 is an illustrative example of one implementation of number of vehicles 303.

Aircraft 306 includes onboard processor 308, number of tires 310, sensor system 312, other aircraft systems 314, data storage device 316, communications unit 318, and user interface 320.

Onboard processor 308 is an illustrative example of one implementation of processor unit 204 in FIG. 2. Onboard processor 308 includes tire monitor 336. Tire monitor 336 is a software agent that continually receives data from sensor system 312 and/or other aircraft systems 314. Tire monitor 336 uses the data to assess, diagnose, transmit, and report on the health and status of number of tires 310. Tire monitor 336 uses communications unit 318 to transmit information about the health of number of tires 310 to remote location 304. Communications unit 318 is an illustrative example of one implementation of communications unit 210 in FIG. 2.

Other aircraft systems 314 may include, for example, without limitation, flight control systems, guidance systems, navigation systems, and/or any other suitable aircraft systems. Parametric data may be received by onboard processor 308 from other aircraft systems 314 and used by tire monitor 336 in conjunction with sensor data from sensor system 312, for example.

Remote location 304 may be any location off-board number of vehicles 303. Remote location 304 may be, for example, without limitation, a back office, a ground station, a vehicle serving as a remote location, and/or any other suitable location remote from number of vehicles 303. Remote location 304 includes data repository 338, off-board processor 340, communications unit 342, and user interface 344.

Data repository 338 may be used to store information received from tire monitor 336 of aircraft 306, in an illustrative example. Data repository 338 may also support a number of algorithms used by off-board processor 340 to assess information received from tire monitor 336. In an illustrative example, tire monitor 336 of aircraft 306 may receive data from sensor system 312 and/or other aircraft systems 314, and transmit the data to off-board processor 340 for health assessment, diagnoses, and reporting. In another illustrative example, tire monitor 336 may process and assess the data received from sensor system 312 and/or other aircraft systems 314 to diagnose a number of issues, and send the diagnostic results to off-board processor 340 for further processing, such as maintenance or operational planning.

Off-board processor 340 may be a number of processors, such as one or more of processor unit 204 in FIG. 2. Off-board processor 340 includes tire monitor 346 and planner 348. In an advantageous embodiment, tire monitor 346 receives data collected by sensor system 312 and transmitted by tire monitor 336 to off-board processor 340. Tire monitor 346 uses the data received to assess, diagnose, transmit, and report on the health of number tires 310. Tire monitor 346 may also transmit information about the health of number of tires 310 to planner 348.

Planner 348 is a software agent that uses information about the health of number of tires 310 to plan maintenance and operational tasks. Planner 348 may display plans on user interface 344, in an illustrative example. User interface 344 is an illustrative example of one implementation of display 214 in FIG. 2. In another advantageous embodiment, user interface 344 may also include peripheral devices, such as a keyboard and mouse, for example.

During operation of aircraft 306, sensor system 312 sends sensor data and other aircraft systems 314 send other data to onboard processor 308, where the data is managed by tire monitor 336 and/or transmitted to tire monitor 346 at remote location 304 for management. The data may be sent continually or the data transmission may be triggered by an event, such as initiating landing gear retraction or extension, for example. The event may be, for example, a periodic event, such as the expiration of a timer. In an illustrative example, the periodic event may occur every second, every minute, or after some other suitable period of time.

In other examples, the event may be non-periodic. For example, the data may be received when the landing gear is activated. The data may continue to be received until the aircraft reaches a taxiway from the runway, the gate or some other location. This allows for real-time management of tire health. Real-time may refer to sending to tire monitoring system 302 immediately following acquisition or processing, in an illustrative example. The data transmitted may be synchronous or asynchronous, in an illustrative example.

Sensor system 312 detects a number of different measurements from number of tires 310. Tire monitor 336 and/or tire monitor 346 continually manages the data received to perform a number of processes including, without limitation, determining whether the measurements detected meet pre-defined criteria, monitoring and recording actual values even if within thresholds, calculating and trending other metrics such as number of landings remaining for tires, and/or any other suitable process. A pre-defined criterion may be any criterion that represents a normal operational value or result, for example.

When tire monitor 336 detects a value outside a pre-defined criteria, tire monitor 336 assesses the data, which may include the value, identification of the component, configuration information for the component, location of the component, and any other suitable information used to assess the health of the component. Tire monitor 336 may transmit the information to remote location 304 for further processing and/or generate an informational status or an alert with information about the health of the component. Tire monitor 336 may display the alert using user interface 320.

Number of tires 310 may include number of identification tags 350. Number of identification tags 350 may include configuration information associated with number of tires 310. In an advantageous embodiment, each tire in number of tires 310 is associated with an identification tag from number of identification tags 350. Number of identification tags 350 may be, for example, without limitation, one or more radio frequency identification (RFID) tags.

Configuration information may be any type of static or historical information about a particular tire. For example, configuration information may include, without limitation, part numbers, serial numbers, manufacturing data, lot codes, maintenance history, and/or any other historical information about a particular tire. Sensor system 312 may include an identification reader that detects this configuration information along with other information about the tire from sensor data sent via the identification tag, and transmits the configuration information to tire monitor 336 for assessment.

The illustration of transportation environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, tire monitoring system 302 may include one instance of tire monitor 346 at remote location 304, and process sensor data at remote location 304, transmitting alerts and information to aircraft 306 over a network, in one advantageous embodiment. In another advantageous embodiment, aircraft 306 may be implemented with components in addition to number of tires 310 that are managed using the monitoring system.

In another advantageous embodiment, one or more components of sensor system 312 may be implemented off-board aircraft 306, and located adjacent to a path of aircraft 306, such as at a gate, embedded in a runway, or other infrastructure, such as a jetway or hanger, for example.

Figure 4:
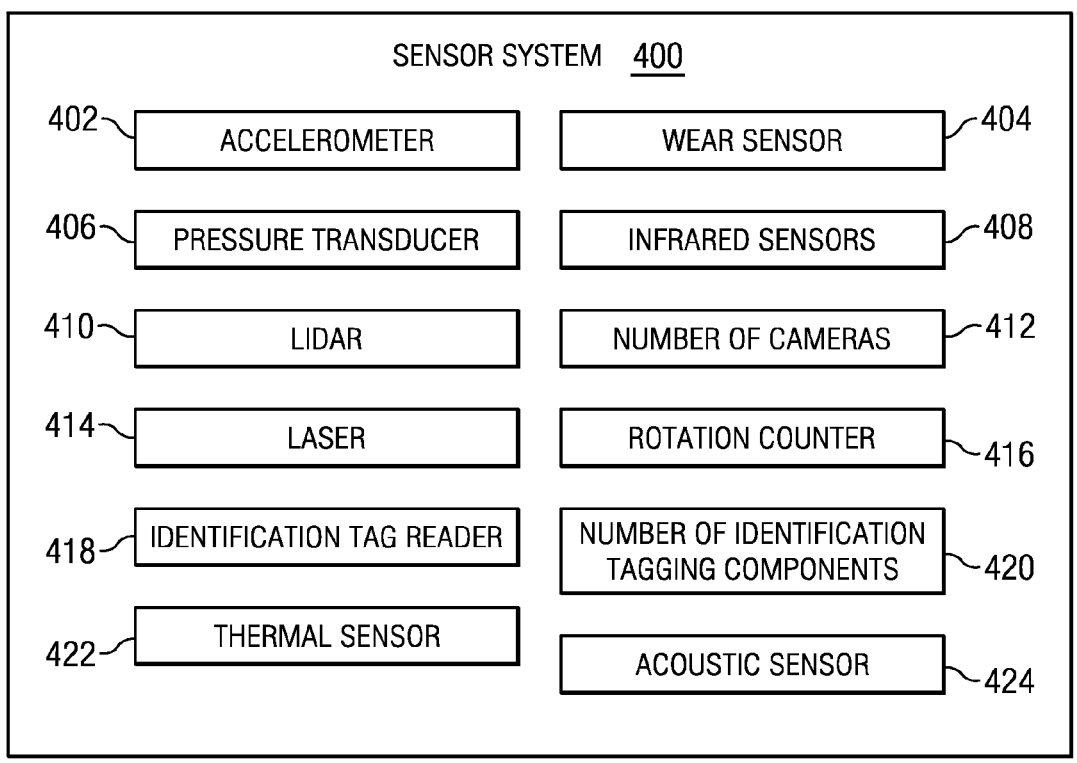
FIG. 4 is an illustration of a sensor system in accordance with an advantageous embodiment.

With reference now to FIG. 4, an illustration of a sensor system is depicted in accordance with an advantageous embodiment. Sensor system 400 is an illustrative example of one implementation of sensor system 312 in FIG. 3.

Sensor system 400 may include, without limitation, accelerometer 402, wear sensor 404, pressure transducer 406, infrared sensors 408, lidar 410, number of cameras 412, laser 414, rotation counter 416, identification tag reader 418, number of identification tagging components 420, thermal sensor 422, and acoustic sensor 424.

Accelerometer 402 measures the acceleration of an object, such as aircraft 306 in FIG. 3. Accelerometer 402 may also measure the acceleration of the tire, in this illustrative example. Wear sensor 404 is any type of sensor that can detect the amount of wear that a tire has undergone. Wear sensor 404 may be an external sensor, such as a camera, or an internal sensor, such as a conductive mesh, for example. Wear or damage sensors detect the presence of cuts, blisters, chunking, or excessive wear on tires, in this illustrative example.

Pressure transducer 406 measures the force per unit area and generates a signal as a function of the pressure imposed. In this illustrative example, the pressure transducer measures the pressure of the gas within a tire. Infrared sensors 408 is a number of infrared imaging sensors that detect wavelengths longer and lower than that of visible light and can be used to measure the temperature of the tire.

Lidar 410 is an optical remote sensing technology that measures properties of scattered light to measure landing gear component wear and damage, such as tire wear and damage profiles, for example. Number of cameras 412 may be any type of device used to capture images, including black and white cameras, color cameras, thermal imaging cameras, video cameras, and the like, which can be used to inspect wear and damage on tires and brakes. Laser 414 emits electromagnetic radiation which can be used to measure tire wear and damage profiles, such as tire or wheel wear and damage profiles, for example.

Rotation counter 416 is used to measure the number of tire rotations, in this illustrative example. Identification tag reader 418 detects and reads information from identification tags, such as number of identification tags 350 of number of tires 310 in FIG. 3. Number of identification tagging components 420 may be an illustrative example of number of identification tags 350 in FIG. 3. Thermal sensor 422 is a device for measuring temperature. Thermal sensor 422 may measure ambient temperature, tire temperature, and/or any other suitable temperature. Acoustic sensor 424 measures acoustic properties of tires that can be used to measure pressure, volume, or other normal or anomalous tire conditions.

In an illustrative example, sensor system 400 may generate sensor data for a number of tires, such as number of tires 310 in FIG. 3. For example, pressure transducer 406 may generate data on the pressure of number of tires 310 in FIG. 3.

The illustration of sensor system 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
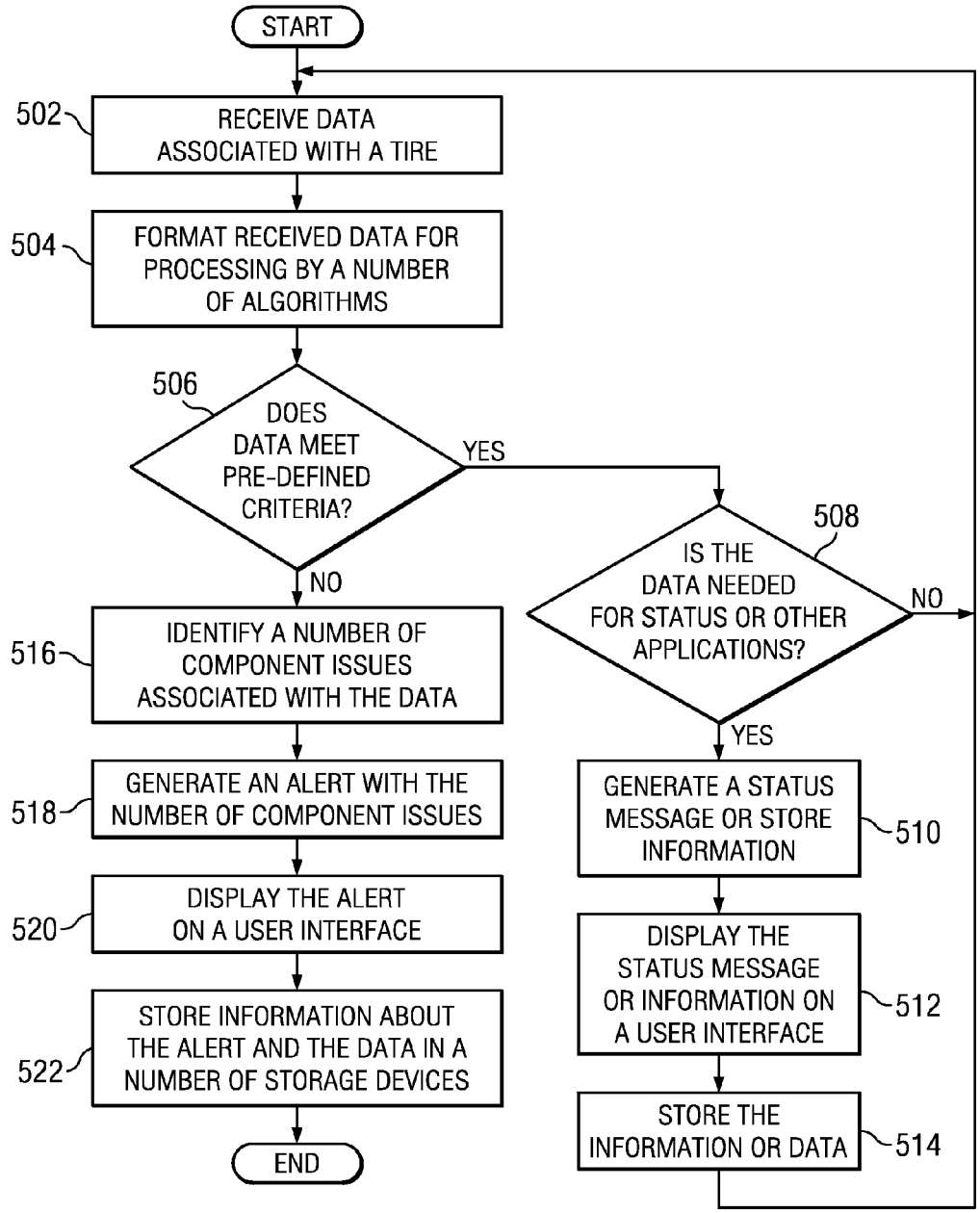
FIG. 5 is an illustration of a flowchart of a process for managing the health of tires in accordance with an advantageous embodiment.

With reference now to FIG. 5, an illustration of a flowchart of a process for managing the health of tires is depicted in accordance with an advantageous embodiment. The process in FIG. 5 may be implemented by a tire monitoring system, such as tire monitoring system 302 in FIG. 3 using tire monitor 336 and/or tire monitor 346, for example.

The process begins by receiving data associated with a tire (operation 502). The data may be received from a number of systems, such as sensor system 312 and/or other aircraft systems 314 in FIG. 3. The data received may be from the vehicle control systems relative to the vehicle speed, attitude, and control inputs, for example. The data received may also be from a sensor system associated with vehicle tires and related components and configured to detect the health and status of a number of tires. Data security and/or data integrity checks may be initiated to confirm the data is from an authorized source and is free of errors, in one advantageous embodiment.

The process formats the data received for processing by a number of algorithms (operation 504).

The number of algorithms include tire health algorithms, for example.

The process then determines whether the data received meets pre-defined criteria (operation 506). The pre-defined criteria may be configured by a user or default values associated with a specific vehicle and/or tire, for example. The criteria may be threshold values, ranges, a number of parameters, and/or any other suitable criteria.

If a determination is made that the data meets the pre-defined criteria, the process determines whether the data is needed for status or other applications (operation 508). If a determination is made that the data is not needed for status or other applications, the process returns to operation 502. If a determination is made that the data is needed for status or other applications, the process generates a status message or stores information (operation 510). The process displays the status message or information on a user interface (operation 512). The process then stores the information or data (operation 514) and returns to operation 502.

If a determination is made in operation 506 that the data does not meet the pre-defined criteria, the process identifies a number of component issues associated with the data (operation 516). A component issue may be, for example, without limitation, a tire pressure outside an expected value.

The process generates an alert with the number of component issues (operation 518). The alert may be generated by a processor unit, such as onboard processor unit 308 in FIG. 3, for example. In an illustrative example, the alert may be a warning of a value outside a threshold or pre-defined criteria. In yet another illustrative example, the alert may be a message to a maintainer or pilot, or information, such as tire carcass and serial numbers. The process displays the alert on a user interface (operation 520). The user interface may be, for example, user interface 320 of aircraft 306. The process then stores information about the alert and the data in a number of storage devices (operation 522), with the process terminating thereafter.

In an advantageous embodiment, the process in FIG. 5 may also generate data which can be used to calculate other conditions. This data will be monitored, recorded, and transmitted to appropriate remote clients. Remote clients may be, for example, clients at the operator or suppliers who wish to track reliability and other metrics. This data may be displayed on user interfaces as a status or it may be used to calculate other metrics, such as tire carcass life.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current inspection frequency of vehicle tires by maintenance personnel requires aircraft operators to employ additional personnel and locate them strategically within their network. Personnel are required to manually and visually inspect appropriate measurands, record the results, and take appropriate actions. Human error can be a by-product of the manual inspection and calculation of these processes.

Current inspection processes result in maintenance actions that are reactive in nature, resulting in gate delays and cancelled flights. These inspections occur at discrete intervals, which encompass multiple flights, thus providing the potential for issues to arise unnoticed between individual flights. The information collected during these current processes is not available to maintenance and operation planners in a sufficiently timely manner to make the most efficient use of the aircraft.

Thus, the different advantageous embodiments provide a system and methods for evaluating and managing the current and future health of tires. Appropriate measurands are sensed, sensor data is collected and processed, transmitted when necessary, and reasoning is performed on the data to generate and present actionable maintenance and operationally pertinent information to appropriate users.

The different advantageous embodiments provide a system and methods for automated collection and storage of data and information related to tires, eliminating the inherent errors induced by a man-in-the-loop and presenting appropriate information in a near real-time fashion. This reduces the probability of delays associated with tires and provides increased efficiency in maintenance processes.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a number of tires on an aircraft, the aircraft including landing gear;
   a number of systems configured to generate data about the number of tires and the aircraft, the number of systems including a tire monitor configured to assess, and report on a health and status of the number of tires, including at least pressure and temperature;
   an onboard processor unit configured to monitor the data for a first threshold, including information from the tire monitor, and manage health of the number of tires while the landing gear is deployed;
   a communications unit configured to transmit the information including the health and status of the number of tires; and
   an off board processor configured to receive the information including the health and status of the number of tires, and wherein the off board processor monitors the data for a second threshold, manages health of the number of tires, and plans maintenance tasks for the number of tires.

2. The apparatus of claim 1 further comprising:
   a user interface, wherein the off board processor provides information to the user interface to display the information about the number of tires.

3. The apparatus of claim 1, wherein the off board processor comprises a tire monitor and a planner, the tire monitor is further configured to identify a number of status messages or a number of issues associated with the number of tires, and the planner is configured to plan maintenance tasks for the number of tires.

4. The apparatus of claim 1, wherein the on board processor unit continually transmit information about the health and status of the number of tires to the off board processor at a remote location for real-time monitoring of tire health.

5. The apparatus of claim 1, wherein the number of systems includes a sensor system configured to communicate with the off board processor unit, the sensor system comprising at least a pressure monitor, a temperature monitor, a wear sensor, and a camera.

6. The apparatus of claim 5, wherein the sensor system includes a pressure transducer to detect pressure in the number of tires and a thermal sensor to detect temperature in the number of tires, a rotation counter, an identification reader, and at least one of an accelerometer, infrared sensor, lidar, laser, identification tagging component, and acoustic sensor.

7. The apparatus of claim 1, wherein the tire monitor further comprises a wear sensor configured to detect tire wear.

8. The apparatus of claim 7, wherein the off board processor is configured to track pressure and temperature information for a tire by tire serial number.

9. The apparatus of claim 1, wherein the communications unit is triggered to transmit the information to the off board processer by one of landing gear retraction, landing gear extension, or a time from landing gear retraction or landing gear extension.

10. A method for managing health of a number of tires on an aircraft having landing gear, the method comprising:
    sensing information, including at least temperature and pressure, for the number of tires;
    processing the information in an onboard processor;
    triggering a transmitting of the information by one of landing gear extension, landing gear retraction, or a time from landing gear extension or landing gear retraction;
    receiving data from a number of systems associated with the number of tires at an off board processor;

determining whether the data received meets pre-defined criteria; and responsive to a determination that the data does not meet the pre-defined criteria, identifying a number of component issues associated with the data.

11. The method of claim 10, wherein the number of systems includes a vehicle control system, and wherein the data includes a vehicle speed, attitude, and control inputs.

12. The method of claim 10, wherein the number of systems includes a sensor system, and wherein the data is sensor data from a number of sensors configured to detect health and status information about a number of tires.

13. The method of claim 10 further comprising:
planning maintenance tasks for the number of tires based on the temperature and pressure information;
generating an alert with at least one of the number of component issues identified, informational messages, and parametric data; and
displaying the alert on a user interface.

14. The method of claim 13, wherein the alert is a status message associated with the number of tires.

15. The method of claim 13 further comprising:
storing information about the alert and the data in a number of storage devices.

16. The method of claim 10 further comprising:
responsive to a determination that the data meets the pre-defined criteria, determining whether the data is needed for status or other applications.

17. The method of claim 16 further comprising:
responsive to a determination that the data is needed for the status or the other applications, generating a status message; and
displaying the status message on a user interface.

18. The method of claim 16 further comprising:
responsive to a determination that the data is needed for the status or the other applications, storing information; and
displaying the status message on a user interface.

19. The method of claim 10, wherein the number of systems include a tire monitor, a sensor system, and other aircraft systems.

20. The method of claim 10, wherein sensing information further comprises sensing tire wear.

21. The method of claim 20 further comprising tracking data for a tire serial number.

22. The method of claim 20 further comprising formatting the information and processing the information by a number of algorithms after formatting.

* * * * *